(12) United States Patent
Hiraoka

(10) Patent No.: US 6,266,213 B1
(45) Date of Patent: Jul. 24, 2001

(54) SUSPENSION HAVING AN IC CHIP AND A HEAD SLIDER ON OPPOSITE SURFACES

(75) Inventor: Shinji Hiraoka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/272,877

(22) Filed: Mar. 19, 1999

(30) Foreign Application Priority Data

Mar. 20, 1998 (JP) .................................. 10-072881

(51) Int. Cl.$^7$ ...................................................... G11B 5/00
(52) U.S. Cl. .................................................. 360/244.1
(58) Field of Search ........................... 360/244.1, 244.2, 360/245.8, 264.2

(56) References Cited

U.S. PATENT DOCUMENTS

| | | | | |
|---|---|---|---|---|
| 5,014,145 | * | 5/1991 | Hosokawa et al. | 360/104 |
| 5,140,482 | * | 8/1992 | Kimura et al. | 360/104 |
| 5,452,151 | * | 9/1995 | Money et al. | 360/75 |
| 5,710,682 | * | 1/1998 | Arya et al. | 360/106 |
| 5,768,062 | | 6/1998 | Anderson et al. | 360/106 |
| 5,859,746 | * | 1/1999 | Ishida et al. | 360/97.01 |
| 5,862,015 | * | 1/1999 | Evans et al. | 360/104 |
| 5,886,858 | | 3/1999 | Yanagihara | 360/106 |
| 5,903,413 | * | 5/1999 | Brooks, Jr. et al. | 360/106 |
| 5,956,211 | * | 9/1999 | Adley | 360/104 |
| 5,961,334 | | 10/1999 | Inaba | 439/67 |
| 5,995,322 | | 11/1999 | Yanagihara | 360/97.01 |
| 6,084,746 | * | 7/2000 | Shiraishi et al. | 360/104 |
| 6,134,084 | * | 10/2000 | Ohwe et al. | 360/244.1 |
| 6,201,667 | | 3/2001 | Yamamoto et al. | 360/264.2 |

FOREIGN PATENT DOCUMENTS

| | | |
|---|---|---|
| 62-217476 | 9/1987 | (JP) . |
| 3-108120 | 5/1991 | (JP) . |
| 3-187295 | 8/1991 | (JP) . |
| 3-192513 | 8/1991 | (JP) . |
| 3-272015 | 12/1991 | (JP) . |
| 8-106617 | 4/1996 | (JP) . |
| 8-255449 | 10/1996 | (JP) . |
| 8-287442 | 11/1996 | (JP) . |
| 9-147510 | 6/1997 | (JP) . |
| 9-161251 | 6/1997 | (JP) . |
| 9-180380 | 7/1997 | (JP) . |
| 9-185803 | 7/1997 | (JP) . |

* cited by examiner

Primary Examiner—Brian E. Miller
(74) Attorney, Agent, or Firm—Greer, Burns & Crain, Ltd.

(57) ABSTRACT

A suspension has a head slider loading prearranged portion on which a head slider integrally having a head is loaded, a head IC chip mounting prearranged portion on which a head IC chip is mounted, and wiring patterns which extend from the head slider loading prearranged portion. The head slider is loaded and supported on the head slider loading prearranged portion of the suspension. The head IC chip is mounted on the head IC chip mounting prearranged portion of the suspension. The head IC chip mounting prearranged portion includes through holes formed in the suspension and head IC chip mounting terminals on a surface of the suspension, which surface is opposite to a surface on which the head slider loading prearranged portion is provided, the terminals being electrically connected with the extending ends of said wiring patterns via the through holes, the terminals being provided in an arrangement corresponding to terminals of the head IC chip. The head IC chip is mounted on the surface of the suspension, which surface is opposite to the surface on which the head slider is loaded.

5 Claims, 9 Drawing Sheets

SUSPENSION HAVING AN IC CHIP AND A HEAD SLIDER ON OPPOSITE SURFACES

BACKGROUND OF THE INVENTION

1. Field of the Invention

The present invention relates to a head slider supporting device, a disk device and a suspension, and, in particular, to a magnetic head slider supporting device, a magnetic disk device and a suspension.

As a frequency of a signal which an information processing apparatus handles increases, a magnetic disk device is demanded to increase a signal writing frequency, from 70 MHz at the present time, to, for example, 200 through 300 MHz. In order to increase the signal writing frequency, it is necessary to reduce the inductance and the electrostatic capacity of a signal transmitting path from a magnetic head slider to a head IC. For this purpose, it is effective to provide the head IC near to the magnetic head slider. This is also effective to cope with a feeble recording signal obtained through reproduction by a magnetic head. On the other hand, the disk device is demanded to be thin. It is necessary that the head IC does not prevent the magnetic disk from being thin and that the head IC is loaded in a condition where the head IC does not come into contact with the magnetic disk or the like even when a shock is applied to the magnetic disk device.

2. Description of the Related Art

Magnetic disk devices, in each of which a head IC for amplifying a signal read through a head is installed on an actuator arm, are disclosed in Japanese Laid-Open Patent Application Nos.62-217476, 3-108120, 3-187295, 3-192513 and so forth.

However, in each of the above-mentioned magnetic disk devices, because the distance between the head and the head IC is long, it is difficult to reduce the inductance and the electrostatic capacity of the signal transmission path from the head to the head IC. Further, the head IC is packaged by a synthetic resin, and thereby, is thick. As a result, in some cases, in order to prevent the head IC from coming into contact with a magnetic disk or the like when a shock is applied to the magnetic disk device, it is necessary to elongate the distance between adjacent magnetic disks. As a result, the magnetic disk device is thick. Further, because the head IC is packaged by the synthetic resin, the head IC is heavy. As a result, the weight of the magnetic head slider supporting device increases. Thereby, the flying stability of the magnetic head slider above the magnetic disk is degraded, and, also, there is a possibility that, when the magnetic head slider comes into contact with a magnetic disk due to a strong shock applied to the magnetic disk device, the shock applied to the magnetic disk is so strong that the magnetic disk is damaged.

Figure 1:
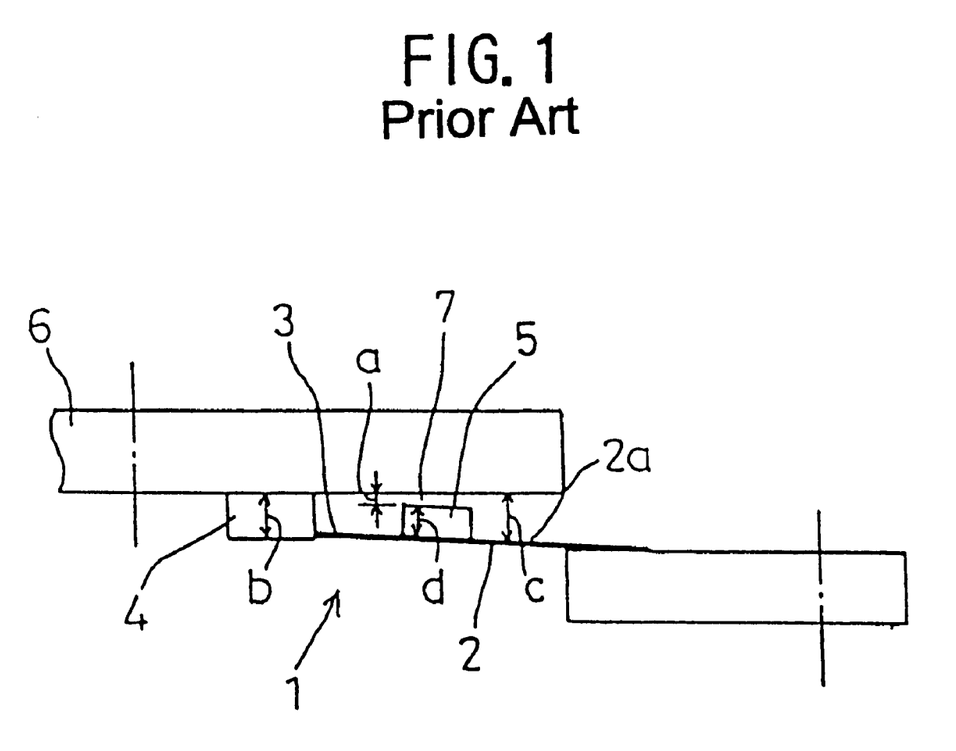
FIG. 1 is used for discussing a case where a head IC is loaded on a top surface of a suspension in a magnetic head slider supporting device which is disclosed in a Japanese patent application filed by the applicant of the present application.

As shown in FIG. 1, in a head slider supporting device 1, on the top surface 2a of a suspension 2 (hereinafter, the position of the suspension shown in FIG. 1 is a reference position thereof, and 'the top surface' of the suspension means the top surface in this position of the suspension), wiring patterns 3 are formed from the extending end to the fixed end of the suspension 2, and a magnetic head slider 4 is loaded on the top surface 2a of the suspension 2 at the extending end of the suspension 2.

Here, provision of a head IC 5 will be considered. Due to the arrangement of the wiring patterns 3, a surface at which the head IC is loaded is limited to the top surface 2a of the suspension 2. When considering an increase of the signal writing frequency, it is preferable that the head IC 5 be provided at a position near to the magnetic head slider 4. Therefore, it is assumed that the head IC 5 is loaded on the top surface 2a of the suspension 2 near the magnetic head slider 4.

In order to prevent the head IC 5 from coming into contact with a magnetic disk 6 even when a strong shock is applied to the magnetic disk device, it is necessary that a gap 7 of the distance 'a' equal to or longer than 0.15 mm be provided between the head IC 5 and the magnetic disk 6.

Recently, in order to thin the magnetic disk device, the magnetic head slider 4 of a small size (a so-called picoslider, the height 'b' of which is 0.3 mm) has been used. As a result, the distance 'c' between the suspension 2 and the magnetic disk 6 is small.

When considering a bare head IC 5, the bare head IC 5 is cut out from a wafer. Accordingly, the thickness of the bare head IC 5 is determined by the thickness of the wafer. At the present time, it is difficult to make the wafer thinner than 0.3 mm. Accordingly, the height (thickness) 'd' of the head IC is approximately 0.3 mm minimum.

Therefore, when the bare head IC 5 is simply loaded on the top surface 2a of the suspension 2, it is difficult to obtain the gap equal to or longer than 0.15 mm between the head IC 5 and the magnetic disk 6.

SUMMARY OF THE INVENTION

An object of the present invention is to provide a head slider supporting device, a disk device and a suspension by which the above-described problem is solved.

A head slider supporting device, according to the present invention, comprises:

a suspension having a head slider loading prearranged portion on which a head slider integrally having a head is loaded, a head IC chip mounting prearranged portion on which a head IC chip is mounted, and wiring patterns which extend from the head slider loading prearranged portion via the head IC chip mounting prearranged portion;

the head slider loaded and supported on the head slider loading prearranged portion of the suspension; and the head IC chip mounted on the head IC chip mounting prearranged portion of the suspension, wherein:

the head IC chip mounting prearranged portion includes through holes formed in the suspension, and head IC chip mounting terminals on a surface of the suspension, which surface is opposite to a surface on which the head slider loading prearranged portion is provided, the terminals being electrically connected with the extending ends of said wiring patterns via the through holes, the terminals being provided in an arrangement corresponding to terminals of the head IC chip; and the head IC chip is mounted on the surface of the suspension, which surface is opposite to the surface on which the head slider is loaded.

Thereby, in a condition where the head slider supporting device is incorporated in a disk device, the head IC chip does not face a disk. Therefore, when a strong shock is applied to the disk device, it is possible to prevent the head IC chip from hitting the disk. Further, because the head IC chip is mounted on a portion of the suspension, it is possible that the length of each of the wiring patterns from the head slider to the head IC chip is several millimeters and thus each wiring pattern is short. As a result, the inductance of each wiring pattern is small. Further, the electrostatic capacity between each pair of adjacent wiring patterns is small. Therefore, in a case where the disk is a magnetic disk and the head slider is a magnetic head slider, it is possible to achieve a magnetic disk device which can write and read a signal of a frequency of, for example, up to 200 MHz, exceeding the 70 MHz of the present time.

The through holes may be provided in an arrangement corresponding to the terminals of the head IC chip, and the head IC chip mounting terminals may be formed at ends of the through holes.

Thereby, it is possible to achieve the head IC chip mounting prearranged portion having no wiring patterns, that is, having a wiring-pattern-less structure. Therefore, it is possible that the head IC chip mounting prearranged portion has a simple structure, and, also, has a structure such that, basically, neither inductance nor electrostatic capacity is developed. As a result, it is possible to improve reliability of mounting of the head IC chip, and, also, it is possible to bring out the characteristics of the bare head IC chip to the maximum degree.

A head slider supporting device, according to another aspect of the present invention, comprises:

a suspension having a head slider loading prearranged portion on which a head slider integrally having a head is loaded, and wiring patterns extending from the head slider loading prearranged portion;

the head slider loaded and supported on the head slider loading prearranged portion; and a spacer which is fixed to the suspension on the side of a fixed end of the suspension, and has a fixing portion which is fixed to an actuator arm, wherein:

the suspension has through holes;

the wiring patterns include extending-end-side wiring patterns which extend from the head slider loading prearranged portion to one end of the through holes on a surface of the suspension on which surface the head slider loading prearranged portion is provided, and fixed-end-side wiring patterns which extend from the other end of the through holes to a position of the fixing portion of the spacer on a surface of the suspension, which surface is opposite to the surface on which the head slider loading prearranged portion is provided, said extending-end-side wiring patterns being electrically connected with said fixed-end-side wiring patterns via said through holes;

the surface of the suspension, which surface is opposite to the surface on which the fixed-end-side wiring patterns extend is fixed to the spacer.

Thereby, as a result of terminals being provided on a side of the actuator arm, it is possible that electrical connection between the head slider supporting device and the side of the actuator arm is performed as a result of the head slider supporting device being fixed to the actuator arm. Therefore, a separate work for performing electrical connection between the head slider supporting device and the side of the actuator arm does not need to be performed.

The fixed-end-side wiring patterns may extend to the position of the fixing portion of the spacer, terminals being provided at extending ends of the fixed-end-side wiring patterns in an arrangement corresponding to terminals of wiring patterns of a flexible cable which extends along the actuator arm.

It is possible that electrical connection between the head slider supporting device and the side of the actuator arm is performed as a result of the head slider supporting device being fixed to the actuator arm. Therefore, a separate work for performing electrical connection between the head slider supporting device and the side of the actuator arm does not need to be performed.

A disk device, according to the present invention, comprises:

an actuator;

a disk to be rotated;

an actuator arm driven by the actuator; and a head slider supporting device which is rotated integrally with the actuator arm;

wherein the head slider supporting device comprises:

a suspension having a head slider loading prearranged portion on which a head slider integrally having a head is loaded, a head IC chip mounting prearranged portion on which a head IC chip is mounted, and wiring patterns which extend from the head slider loading prearranged portion;

the head slider loaded and supported on the head slider loading prearranged portion of the suspension; and the head IC chip mounted on the head IC chip mounting prearranged portion of the suspension, wherein:

the head IC chip mounting prearranged portion includes through holes and head IC chip mounting terminals on a surface of the suspension, which surface is opposite to a surface on which the head slider loading prearranged portion is provided, the terminals being electrically connected with the extending end of said wiring patterns via the through holes, the terminals being provided in an arrangement corresponding to terminals of the head IC chip; and the head IC chip is mounted on the surface of the suspension, which surface is opposite to the surface on which the head slider is loaded.

A disk device, according to another aspect of the present invention, comprises:

an actuator;

a disk to be rotated;

an actuator arm driven by the actuator; and a head slider supporting device which is rotated integrally with the actuator arm;

wherein the head slider supporting device comprises:

a suspension having a head slider loading prearranged portion on which a head slider integrally having a head is loaded, and wiring patterns extending from the head slider loading prearranged portion;

the head slider loaded and supported on the head slider loading prearranged portion; and a spacer which is fixed to the suspension on the side of a fixed end of the suspension, and has a fixing portion which is fixed to the actuator arm, wherein:

the suspension has through holes;

the wiring patterns include extending-end-side wiring patterns which extend from the head slider loading prearranged portion to one end of the through holes on a surface of the suspension on which surface the head slider loading prearranged portion is provided, and fixed-end-side wiring patterns which extend from the other end of the through holes to a position of the fixing portion of the spacer on a surface of the suspension, which surface is opposite to the surface on which the head slider loading prearranged portion is provided, said extending-end-side wiring patterns being electrically connected with said fixed-end-side wiring patterns via said through holes;

the surface of the suspension, which surface is opposite to the surface on which the fixed-end-side wiring patterns extend is fixed to the spacer.

In each of these disk devices, in a case where the disk is a magnetic disk and the head slider is a magnetic head slider, it is possible to achieve a magnetic disk device which can write and read a signal of a frequency of, for example, up to 200 MHz, exceeding the 70 MHz of the present time.

A suspension, according to the present invention, has a head slider loading prearranged portion on which a head slider integrally having a head is loaded, a head IC chip mounting prearranged portion on which a head IC chip is mounted, and wiring patterns which extend from the head slider loading prearranged portion, and the head IC chip mounting prearranged portion includes through holes formed in the suspension and head IC chip mounting terminals on a surface of the suspension, which surface is opposite to a surface on which the head slider loading prearranged portion is provided, the terminals being electrically connected with the extending end of said wiring patterns via the through holes, the terminals being provided in an arrangement corresponding to terminals of the head IC chip.

Thereby, it is possible to provide the suspension in which it is possible to mount the head IC chip on the surface opposite to the surface on which the head slider is loaded.

The through holes may be provided in an arrangement corresponding to the terminals of the head IC chip, and the head IC chip mounting terminals may be formed at ends of the through holes.

Thereby, it is possible that the head IC chip mounting prearranged portion has no wiring patterns, that is, has a wire-pattern-less structure. Therefore, it is possible that the head IC chip mounting prearranged portion has a simple structure, and, also, has a structure such that, basically, neither inductance nor electrostatic capacity is developed.

A suspension, according to another aspect of the present invention, has a head slider loading prearranged portion on which a head slider integrally having a head is loaded, and wiring patterns extending from the head slider loading prearranged portion, wherein:

the suspension has through holes; and the wiring patterns include extending-end-side wiring patterns which extend from the head slider loading prearranged portion to one end of the through holes on a surface of the suspension on which surface the head slider loading prearranged portion is provided, and fixed-end-side wiring patterns which extend from the other end of the through holes on a surface of the suspension, which surface is opposite to the surface on which the head slider loading prearranged portion is provided, said extending-end-side wiring patterns being electrically connected with said fixed-end-side wiring patterns via said through holes.

Thereby, in a case where a head slider supporting device is assembled using this suspension, it is possible to achieve the head slider supporting device such that electrical connection between the head slider supporting device and the side of an actuator arm is per-formed as a result of the head slider supporting device being fixed to the actuator arm, and, therefore, a separate work for performing electrical connection between the head slider supporting device and the side of the actuator arm does not need to be performed.

Other objects and further features of the present invention will become more apparent from the following detailed description when read in conjunction with the accompanying drawings.

DETAILED DESCRIPTION OF THE PREFERRED EMBODIMENTS

Figure 5A:
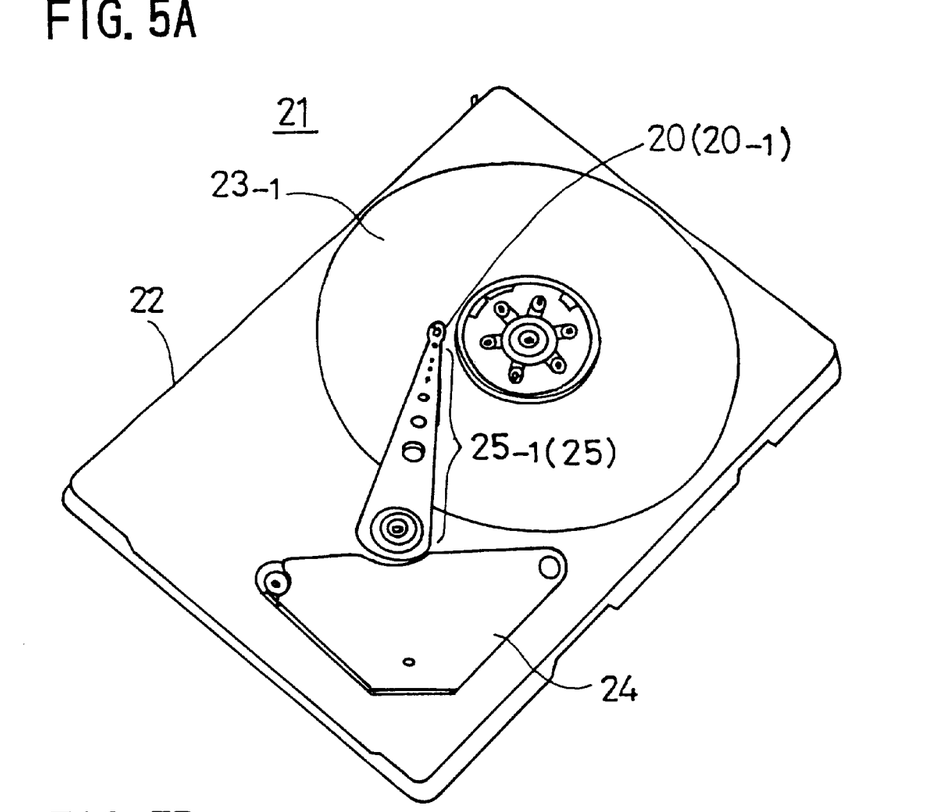
FIGS. 5A and 5B show a magnetic disk device in which the magnetic head slider supporting device shown in FIG. 2 is used.
Figure 5B:
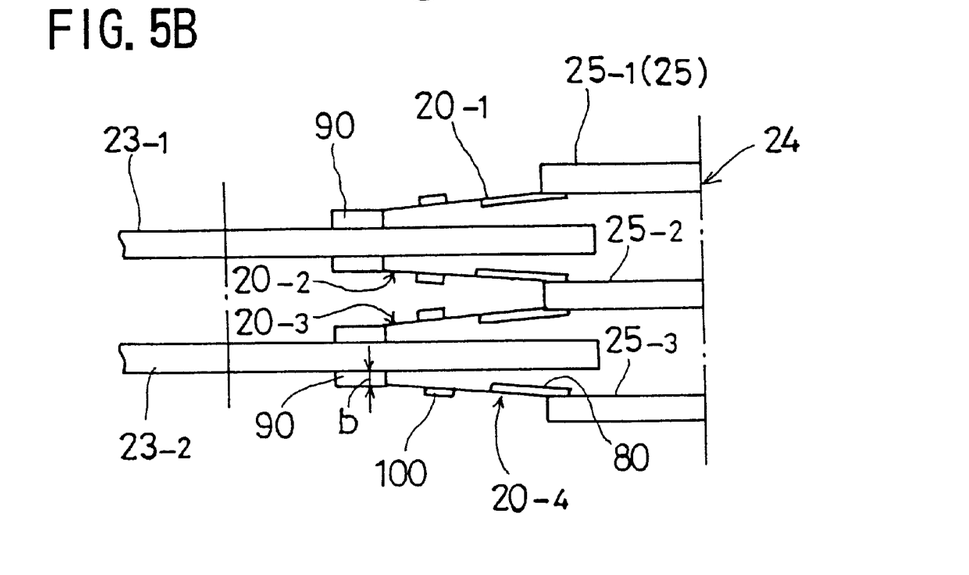

FIGS. 2, 3A through 3D show a magnetic head slider supporting device 20 in a first embodiment of the present invention. FIGS. 5A and 5B show a magnetic disk device 21 having the magnetic head slider supporting device 20 shown in FIG. 2.

The magnetic disk device 21 has an arrangement in which two rotating magnetic disks 23-1, 23-2, an actuator 24 which has a coil and a permanent magnet and is driven electromagnetically, actuator arms 25-1, 25-2, 25-3 which are rotated by the actuator 24, and the magnetic head slider supporting devices 20-1, 20-2, 20-3 and 20-4 which are fixed to the extending ends of the actuator arms 25-1, 25-2 and 25-3, respectively, are contained in a housing 22. The magnetic disks 23-1 and 23-2 rotate, the actuator 24 is driven, the actuator arms 25-1, 25-2 and 25-3 are rotated, the magnetic head slider supporting devices 20-1, 20-2, 20-3 and 20-4 are moved integrally with the actuator arms 25-1, 25-2 and 25-3, and magnetic head sliders 90 loaded on the extending ends of the magnetic head slider supporting devices 20-1, 20-2, 20-3 and 204, respectively, access predetermined tracks of the magnetic disk 23-1 and 23-2, respectively, so that information recording on and information reproducing from the magnetic disks 23-1 and 23-2 are performed.

The magnetic head slider supporting devices 20-1, 20-2, 20-3 and 20-4 have arrangements the same as each other, and a reference numeral 20 is used for indicating one of these magnetic head slider supporting devices.

Figure 2:
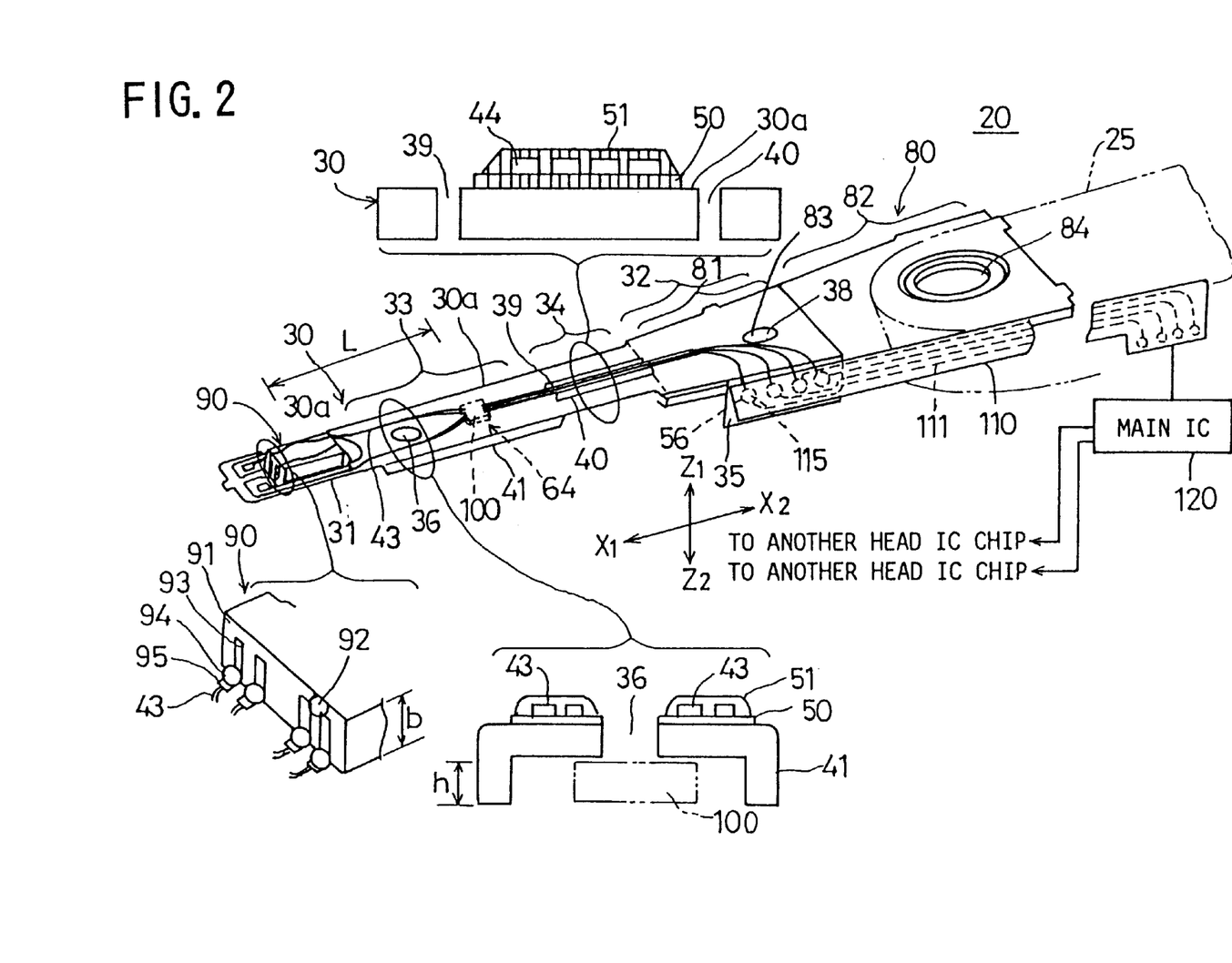
FIG. 2 shows a perspective view of a magnetic head slider supporting device in a first embodiment of the present invention.
Figure 3A:
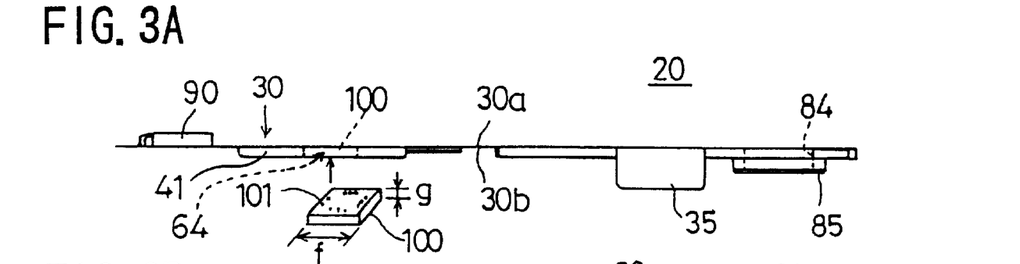
FIGS. 3A, 3B, 3C and 3D show the magnetic head slider supporting device in the first embodiment of the present invention.
Figure 3B:
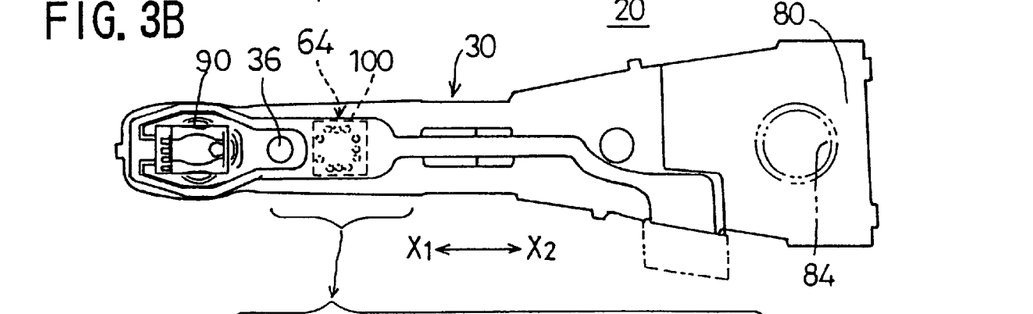
Figure 3C:
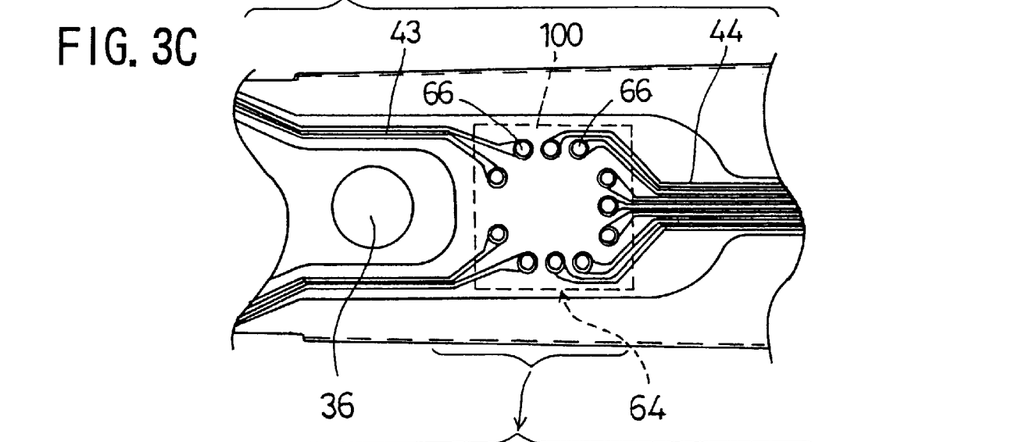

As shown in FIGS. 2, 3A and 3B, the magnetic head slider supporting device 20 includes a suspension 30, a spacer (junction member) 80, the magnetic head slider 90, a bare head IC chip 100, and a flexible printed-circuit board 110 for wiring. When the suspension 30 positioned as shown in FIG. 2 is considered as a reference, the magnetic head slider 90 is located on the side of the top surface 30a of the suspension 30, and the spacer 80 and the bare head IC chip 100 are located on the side of the bottom surface 30b of the suspension 30. Thus, the bare head IC chip 100 is provided on the surface opposite to the surface on which the magnetic head slider 90 is provided.

Respective members which are included in the magnetic head slider supporting device 20 will now be described. First, the suspension 30 will be described. The suspension 30 is made of a stainless steel plate having a thickness of 25 μm. The suspension 30 has a magnetic head slider loading prearranged portion 31, having a gimbal structure, on the side of the extending end (X1 side) thereof, a fixing portion 32, which is fixed on the spacer 80, on the side of the fixed end (X2 side) of the suspension 30, a rigid portion 33, which has rigidity and does not bend, continuing to the magnetic head slider loading prearranged portion 31, and an elastically bending portion 34, which elastically bends, extending between the rigid portion 33 and the fixing portion 32. The suspension 30 has a tongue portion 35 which is bent at a right angle downward (Z2 direction) along the longitudinal direction of the suspension 30 at one side of the fixing portion 32. A plurality of openings 36, 38 and two slits 39, 40 are formed in the suspension 30. The slits 39, 40 are formed in parallel in the elastically bending portion 34 so that the elastically bending portion 34 elastically bends easily. The rigidity of the rigid portion 33 is provided by rib portions 41 formed as a result of being bent downward (Z2 direction) at both sides of the width direction of the suspension 30 (see FIG. 2). The height of each rib 41 is 'h'.

On the top surface of the magnetic head slider loading prearranged portion 31, as shown in FIG. 2, after magnification, a plurality of pad terminals 95 are formed side by side. On the tongue portion 35, as shown in FIG. 2, a plurality of pad terminals 56 are formed side by side.

Figure 4A:
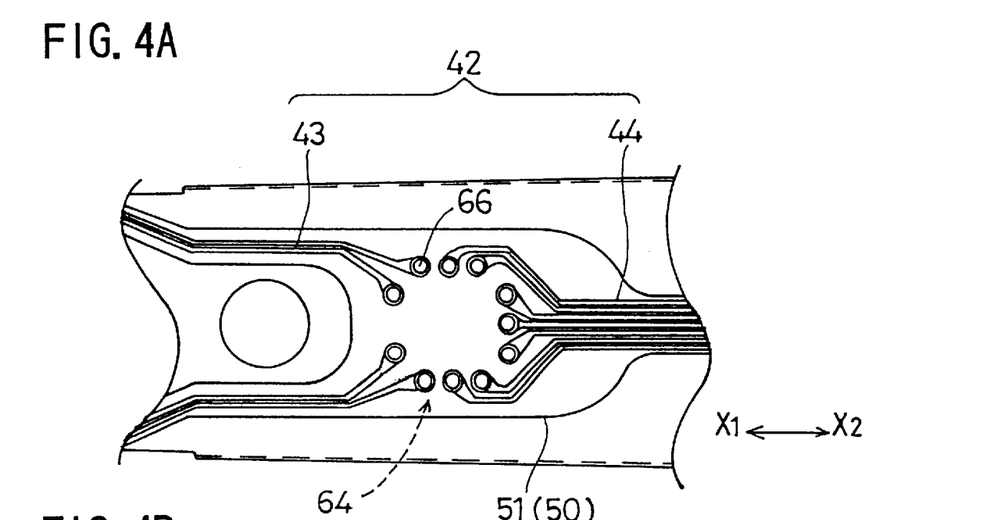
FIGS. 4A, 4B and 4C show a portion of a suspension, after magnification, of the magnetic head slider supporting device in the first embodiment of the present invention.
Figure 4B:
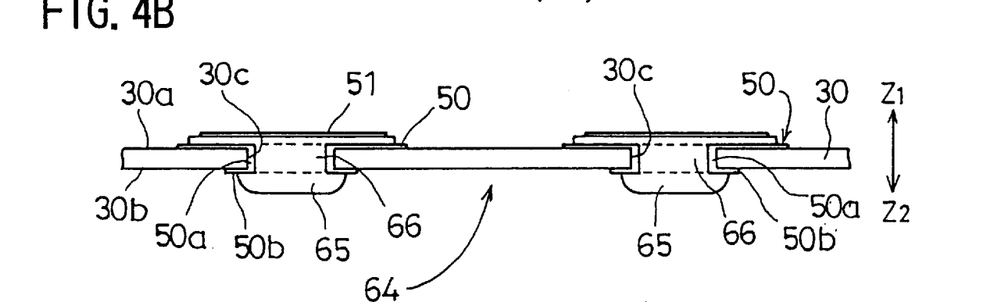
Figure 4C:
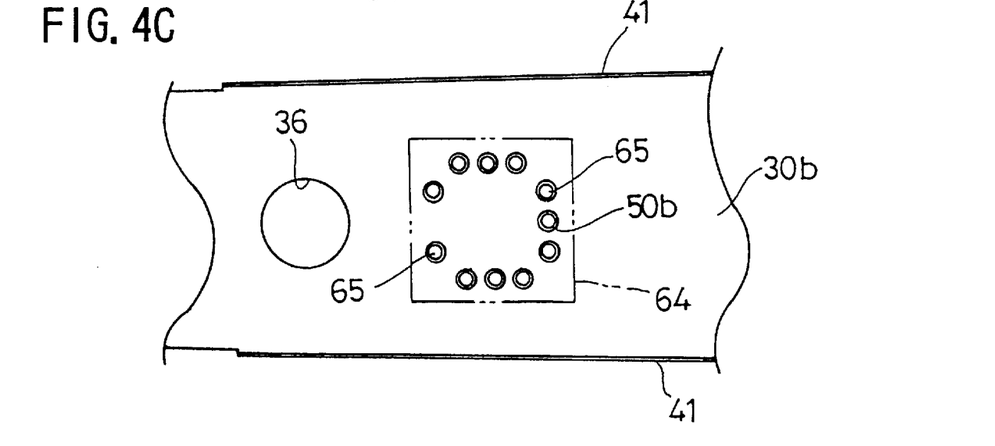

As shown in FIGS. 4A, 4B and 4C after magnification, a bare head IC chip mounting prearranged portion 64 is formed on the bottom surface 30b of the suspension 30. A position of the bare head IC chip mounting prearranged portion 64 is a portion in the rigid portion 33, on the center line of the suspension 30, and on the side of the fixed end (X2 side) with respect to the opening 36.

As shown in FIG. 4B after magnification, in the bare head IC chip mounting prearranged portion 64, a plurality of head IC chip mounting bump terminals 65 are provided in an arrangement corresponding to an arrangement of minute bumps 101 of the bare head IC chip 100 shown in FIG. 3A.

A plurality of through holes 66 are formed in the suspension 30. The plurality of through holes 66 are located in the arrangement corresponding to the arrangement of the bumps 101 of the bare head IC chip 100. Each of the above-mentioned head IC chip mounting bump terminals 65 is formed at the end, in the Z2 direction, of the respective one of the through holes 66 formed in the suspension 30.

Further, as shown in FIG. 4B, each of the through holes 66 and each of the head IC chip mounting bump terminals 65 are insulated from the suspension 30 by a portion 50a which extends from a bottom insulating layer 50 and covers the inner wall 30c of the through hole 66 of the suspension 30, and by a portion 50b which covers the bottom surface 30b of the suspension 30 in proximity to the through hole 66. Each of the through holes 66 is filled with an electrically conducting member, and the respective one of the bump terminals 65 is mechanically integrated with and also electrically connected with this electrically conducting member. In addition, the head IC chip mounting bump terminals 65 are electrically insulated from each other.

With reference to FIG. 4A, a plurality of wiring patterns 42 made of copper for signal transmission, including extending-end-side wiring patterns 43 and fixed-end-side wiring patterns 44, are formed on the top surface 30a of the suspension 30. The wiring patterns 42 are formed on the base layer 50, made of polyimide, provided on the top surface 30a of the suspension 30, and are covered and protected by a covering layer 51 also made of polyimide.

The extending-end-side wiring patterns 43 extend between the pad terminals 95 on the top surface of the magnetic head slider loading prearranged portion 31 and the ends, in the Z1 direction, of the electrically conducting members of predetermined ones of the through holes 66, respectively. The fixed-end-side wiring patterns 44 extend between the ends, in the Z1 direction, of the electrically conducting members of the remaining ones of the through holes 66 and the pad terminals 56 provided on the tongue portion 35, respectively.

The spacer 80 will now be described. The spacer 80 is made of a stainless steel plate having a thickness of 0.25 mm, has a suspension fixing portion 81 on the side of the extending end (X1 side) thereof and has a fixing portion 82 on the side of the fixed end (X2 side) thereof for fixing the spacer 80 to the actuator arm 25, as shown in FIG. 2. The suspension fixing portion 81 has a projection 83 on the top surface thereof, and the fixing portion 82 has a ring-shape projection 85 on the bottom surface thereof. The ring-shape projection 85 has a hole 84 for staking. The spacer 80 is used for fixing the suspension 30 to the actuator arm 25, that is, the spacer 80 is used for fixing the magnetic head slider supporting device 20 to the actuator arm 25.

The magnetic head slider 90 will now be described. The magnetic head slider 90 is a so-called pico-slider, and has the height 'b' of 0.3 mm. As shown in FIG. 2, a thin-film head 92 is formed on an end surface 91 of the magnetic head slider 90 through thin film forming. This thin-film head 92 has a structure of an integral combination of an inductance head for recording and a head for reproducing using a magneto-resistance effect element or a giant magneto-resistance effect element. The magnetic head slider 90 further has, on the end surface 91, wiring patterns (not shown in FIG. 2), extending from the head, and terminals 93 which are the extending ends of these wiring patterns.

Figure 3D:
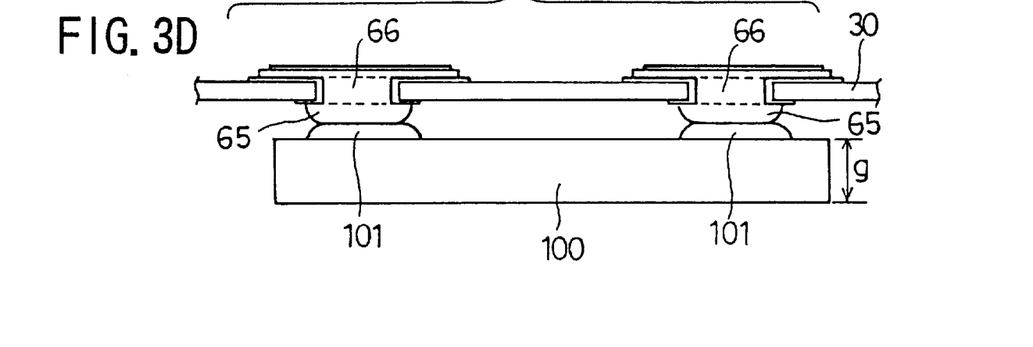

The bare head IC chip 100 will now be described. An integrated circuit is formed on the bare head IC chip 100, the integrated circuit is covered by a protection film, and the minute bumps 101 are aligned on the top surface of the bare head IC chip 100, as shown in FIG. 3A and 3D. The arrangement of the minute bumps 101 corresponds to the arrangement of the above-mentioned pad terminals 65. The bare head IC chip 100 includes a circuit for amplifying the signal reproduced through the head 92. The thickness 'g' of the bare head IC chip 100 is short, for example, 0.3 mm, and is approximately equal to the height 'h' of each of the rib portions 41.

The dimension 'f' of one side of the bare head IC chip 100 is, for example, slightly shorter than 1 mm, and thus the bare head IC chip 100 is very short in comparison to the 5-mm dimension of one side of a head IC in the related art, which head IC is sealed by synthetic resin. The thickness 'g' of the bare head IC chip 100 is, for example, 0.3 mm, and thus the bare head IC chip 100 is very thin in comparison to the head IC in the related art, which head IC is sealed by the synthetic resin and has a total thickness of 2 mm. The weight of the bare head IC chip 100 is 0.5 mg, and thus, the bare head IC chip 100 is very light in comparison to the head IC in the related art, which head IC is sealed by the synthetic resin and has a total weight of 10 mg.

The flexible printed-circuit board 110 will now be described. The flexible printed-circuit board 110 is a belt-shape member having a width on the order of 1 mm, has four wiring patterns 111 extending in the X1, X2 directions and has a plurality of pad terminals 115 at the extending ends of these wiring patterns, as shown in FIG. 2.

The arrangement of the magnetic head slider supporting device 20 will now be described.

As shown in FIG. 2, positioning of the suspension 30 is performed as a result of the projection 83 of the spacer 80 being caused to fit into the opening 38 of the suspension 30, and the fixing portion 32 of the suspension 30 is fixed onto the suspension fixing portion 81 of the spacer 80 through welding or the like. The tongue portion 35 is located on the side of a side wall of the spacer 80. The elastically bending portion 34 extends from the spacer 80. The magnetic head slider 90 is adhered to the magnetic head slider loading prearranged portion 31 of the suspension 30, thus being loaded and supported thereon. Each of the terminals 93 of the magnetic head slider 90 is connected with the respective one of the pad terminals 95 through thermocompression of a respective one of Au balls 94.

The minute bumps 101 of the bare head IC chip 100 are connected with the minute pad terminals 65, respectively, through the facedown flip chip method. The bare head IC chip 100 is mounted on the bare head IC chip mounting prearranged portion 64 of the suspension 30 through thermocompression, ultrasonic waves or adhesion. As shown in FIG. 3A, the thickness 'g' of the bare head IC chip is within the height of the rib portions 41.

The pad terminals 115 of the flexible printed-circuit board 110 are connected with the pad terminals 56 of the tongue portion 35, respectively, so that the flexible printed-circuit board 110 is connected with the tongue portion 35. The flexible printed-circuit board 110 extends in the X2 direction.

The above-described magnetic head slider supporting device 20 is fixed to the extending end of the actuator arm 25 using the hole 84 for staking of the fixing portion 82 of the spacer 80, and, thus, extends in the axis direction of the actuator arm 25 from the extending end of the actuator arm 25.

The other end of the flexible printed-circuit board 110 is connected with a circuit board (not shown in the figures) of the magnetic disk device 21, and is connected with a main IC 120 which is sealed by synthetic resin and mounted on the above-mentioned circuit board. The main IC 120 includes a recording and reproducing circuit, an amplifying circuit and so forth.

Each of the other magnetic head slider supporting devices in the magnetic disk device 21 has an arrangement the same as the above-described magnetic head slider supporting device 20. The other end of the flexible printed-circuit board of each of the other magnetic head slider supporting devices in the magnetic disk device 21 is also connected with the main IC 120.

FIGS. 5A and 5B show the magnetic disk device 21 in which the above-described magnetic head slider supporting devices 20 (20-1, 20-2, 20-3 and 20-4) are incorporated.

FIG. 5B shows the state in which the bare head IC chips 100 are mounted, and the spatial relationship between the mounted bare head IC chips 100 and the magnetic disks 23-1, 23-2.

The magnetic head slider supporting device 20 (magnetic disk device 21) having the above-described arrangement has the following advantages.

1) Each of the mounted bare head IC chips 100 is located on the side such that each of the bare head IC chips 100 does not face the respective one of the magnetic disks 23-1 and 23-2. As a result, when a strong shock is applied to the magnetic disk device 21, the bare head IC chips 100 are prevented from coming into contact with the magnetic disks 23-1, 23-2.

2) The length L (shown in FIG. 2) of each of the extending-end-side wiring patterns 43 is approximately 3 mm and thus each wiring pattern is short. As a result, the inductances of the extendingend-side wiring patterns 43 are small. Further, the electrostatic capacities between adjacent extending-end-side wiring patterns 43 are small. Therefore, the magnetic disk device 21 can write and read a signal of a frequency of, for example, up to 200 MHz, exceeding the 70 MHz of the present time. Further, it is possible to precisely amplify a feeble signal read through the magnetic head slider.

3) The weight of the bare head IC chip 100 is 0.5 mg and thus the bare head IC chip 100 is very light. Therefore, the influence of each of the bare head IC chips 100, mounted on the respective one of the top surfaces 30a of the suspensions 30, on the contact pressure of the respective one of the magnetic head sliders 90 onto the respective one of the magnetic disks 23-1, 23-2 is very small. Thereby, the stability of floating of each of the magnetic head sliders 20 above the respective one of the magnetic disks 23-1, 23-2 is kept well, and, also, when a strong shock is applied to the magnetic disk device 21 and thereby a head crash occurs, that is, the magnetic head sliders 90 come into contact with the magnetic disks 23-1, 23-2, the energy of the head crash can be limited to be small.

4) Because the bare head IC chip mounting prearranged portion 64 does not affect the characteristics of the suspension 30, each of the magnetic head sliders 90 floats above the respective one of the magnetic disks 23-1, 23-2 stably.

5) The bare head IC chip 100 is mounted on the rigid portion 33 of the suspension 30. As a result, the portion at which the bare head IC chip 100 is mounted does not bend. Accordingly, when a shock is applied to the magnetic disk device 21, a portion at which each of the minute bumps 101 of the bare head IC chip 100 is connected with the respective one of the minute pad terminals 65 is prevented from having cracks developed therein.

6) Each of the head IC chip mounting bump terminals 65 is formed at the end, in the Z2 direction, of the electrically conducting member of the respective one of the through holes 66. As a result, it is possible to provide a structure of the head IC chip mounting prearranged portion 64 on which no wiring patterns are provided, that is, a wiring-pattern-less structure. Such a structure is simple, and, also, is a structure in which neither inductance nor electrostatic capacity is developed. As a result, it is possible to improve reliability of mounting of the head IC chip 100, and, also, it is possible to bring out the characteristics of the bare head IC chip 100 to the maximum degree.

A variant embodiment of the above-described first embodiment will now be described. It is possible that wiring patterns are formed which extend from the Z2-direction end of the electrically conducting members of the through holes 66, respectively, on the bottom surface 30b of the suspension 30, and a head IC chip mounting bump terminal is provided at the extending end of each of these wiring patterns.

A magnetic head slider supporting device in a second embodiment of the present invention will now be described.

Figure 6:
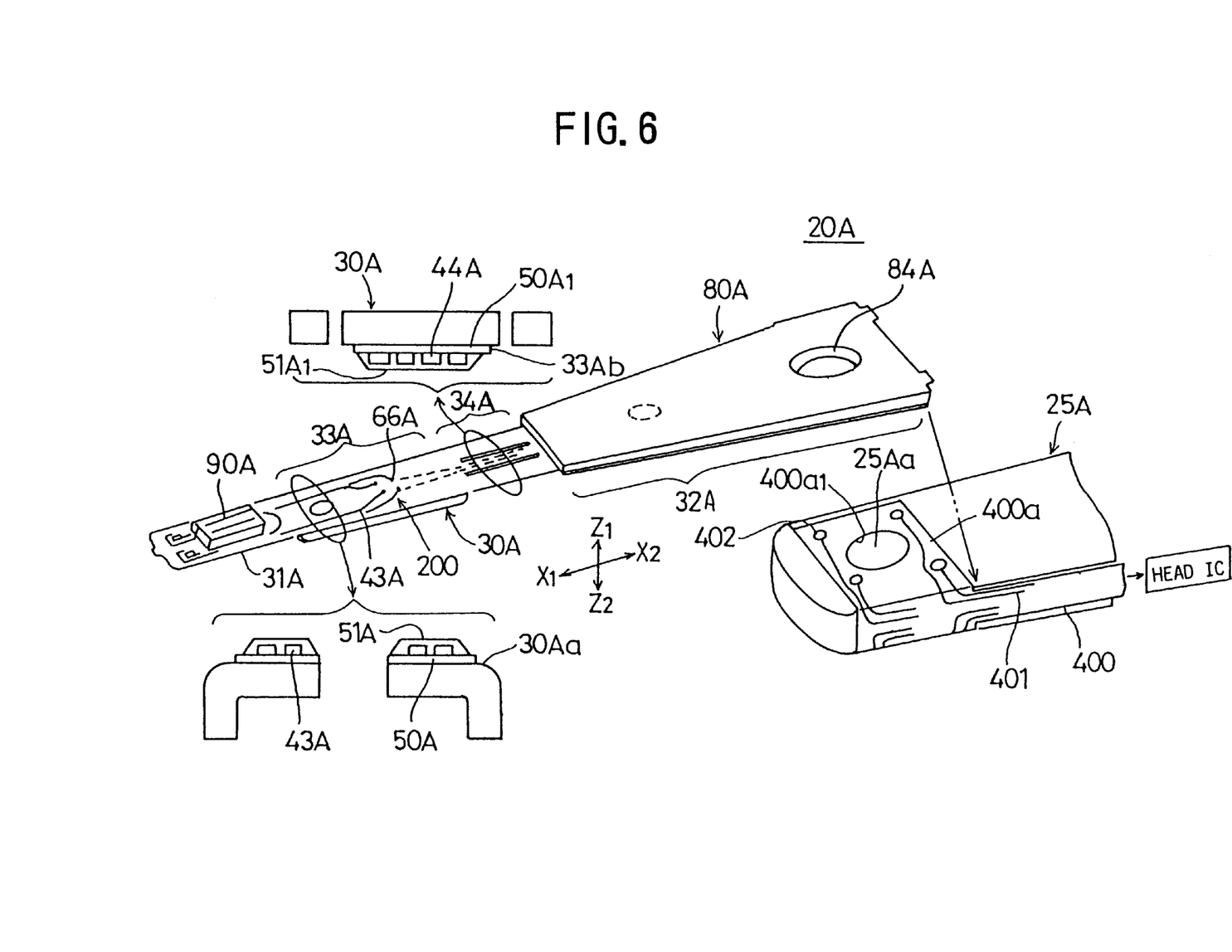
FIG. 6 shows a perspective view of a magnetic head slider supporting device in a second embodiment of the present invention.
Figures 7A, 7B:
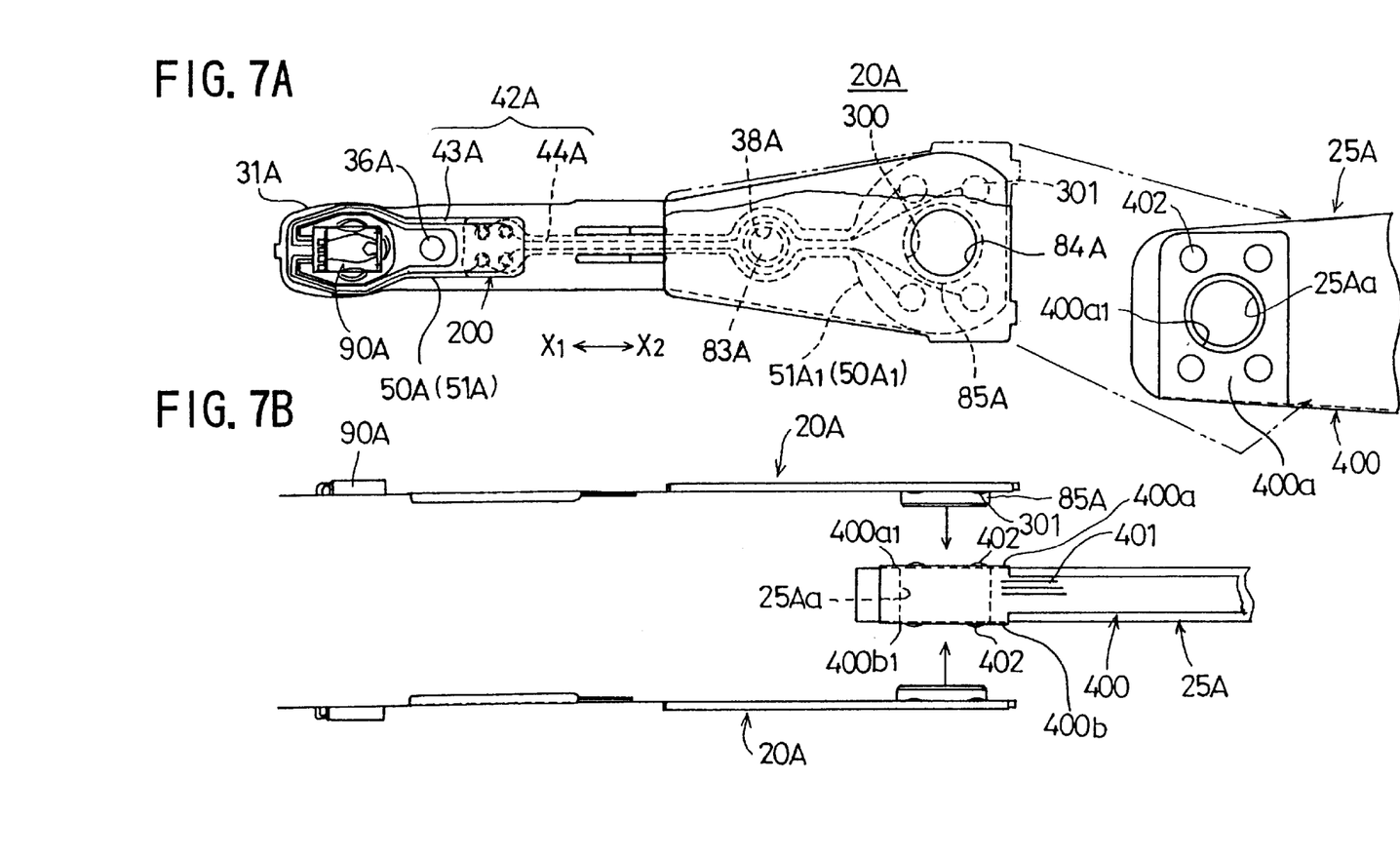
FIGS. 7A and 7B show the magnetic head slider supporting device in the second embodiment of the present invention.

FIGS. 6, 7A and 7B show the magnetic head slider supporting device 20A in the second embodiment of the present invention. In FIGS. 6 through 9B, the same reference numerals with suffix A are given to portions corresponding to those shown in FIGS. 2 through 5B.

As shown in FIGS. 6, 7A and 7B, the magnetic head slider supporting device 20A includes a suspension 30A, a spacer 80A and a magnetic head slider 90A.

The suspension 30A includes a magnetic head slider loading prearranged portion 31A (having a gimbal structure) on the side of the extending end (X1 side) thereof and a fixing portion 32A on the side of the fixed end (X2 side) thereof. The fixing portion 32A is fixed to the spacer 80A. The suspension 30A further includes a rigid portion 33A and an elastically bending portion 34A. The suspension 30A further includes, on the side of the fixed end, an opening 38A which is fitted into by a projection 83A provided on the bottom surface of the spacer 80A and an opening 300 which is fitted into by a ring-shape projection 85A provided on the bottom surface of the spacer 80A.

Figure 8A:
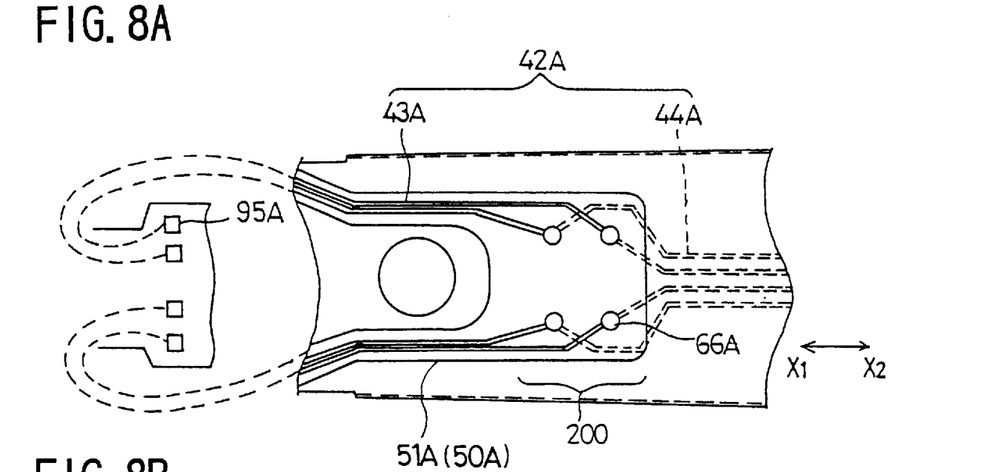
FIGS. 8A, 8B and 8C show a portion of a suspension, after magnification, of the magnetic head slider supporting device in the second embodiment of the present invention.
Figure 8B:
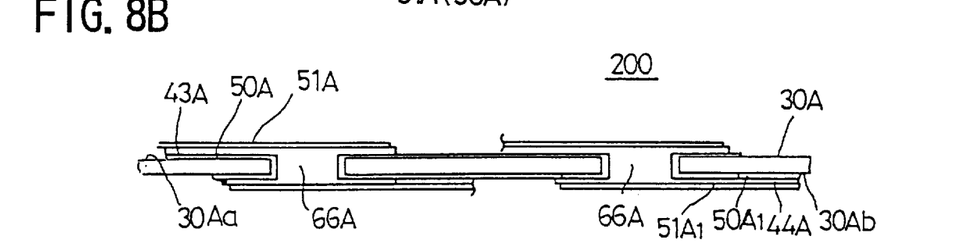
Figure 8C:
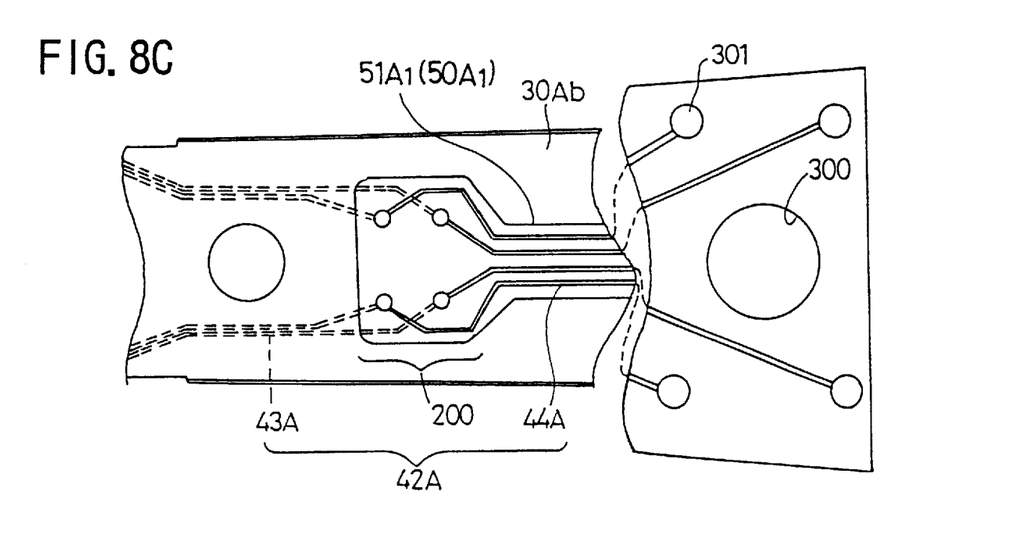

With reference also to FIGS. 8A, 8B and 8C, the suspension 30A includes a junction portion 200 at a portion of the rigid portion 33. The junction portion 200 includes four through holes 66A which are provided in an arrangement corresponding to respective corners of a square. The junction portion 200 is used for causing wiring patterns to pass therethrough from the top surface 30Aa to the bottom surface 30Ab of the suspension 30A.

A plurality of wiring patterns 42A for signal transmission are provided. The wiring patterns 42A include extending-end-side wiring patterns 43A and fixed-end-side wiring patterns 44A. The extending-end-side wiring patterns 43A are formed on the top surface 30Aa of the suspension 30A while the fixed-end-side wiring patterns 44A are formed on the bottom surface 30Ab of the suspension 30A. The extending-end-side wiring patterns 43A extend, from pad terminals 95A, shown in FIG. 8A, provided on the top surface of the magnetic head slider loading prearranged portion 31A, in the X2 direction on the top surface 30Aa of the suspension 30A, and reach the ends, in the Z1 direction, of electrically conducting members filled in the through holes 66A, respectively. The fixed-end-side wiring patterns 44A extend, from the ends, in the Z2 direction, of the electrically conducting members of the through holes 66A, in the X2 direction on the bottom surface 30Ab of the suspension 30A, pass both sides of the opening 38A, and reach a fixed end portion of the suspension 30A. At the ends of the fixed-end-side wiring patterns 44A, terminals 301 are formed, as shown in FIG. 8C. The terminals 301 are provided, around the opening 300, in an arrangement corresponding to respective corners of a square. The extending-end-side wiring patterns 43A are insulated by insulation layers 50A and 51A while the fixed-end-side wiring patterns 44A are insulated by insulating layers 50A1 and 51A1, as shown in FIG. 8B.

Thus, the wiring patterns 42A from the pad terminals 95A to the terminals 301 extend on the top surface 30Aa of the suspension 30A first, go to the bottom surface 30Ab of the suspension 30A on the way at the junction portion 200, and, then, extend on the bottom surface 30Ab of the suspension 30A.

The magnetic head slider 90A is loaded on the magnetic head slider loading prearranged portion 31A of the suspension 30A.

The projection 83A and the ring-shape projection 85A are provided on the bottom surface of the spacer 80A. An opening 84A is provided at the center of the ring-shape projection 85A.

The opening 38A of the suspension 30A is fitted into by the projection 83A of the spacer 80, the opening 300 of the suspension 30A is fitted into by the ring-shape projection 85A, and, thus, the suspension 30A is positioned with respect to the spacer 80. Then, the suspension 30A is fixed onto the bottom surface of the spacer 80A through welding or the like.

As shown in FIGS. 6, 7A and 7B, a belt-shape flexible printed cable 400 having wiring patterns 401 provided thereon is fixed to an actuator arm 25A. The flexible printed cable 400 extends on top and bottom sides on the side of the X1-direction end, and is bent so as to form flap portions 400a and 400b which cover the top surface and the bottom surface, respectively, of the actuator arm 25A on the side of the extending end thereof. The actuator arm 25A has a through hole 25Aa at an extending portion thereof, the through hole 25Aa being used for positioning the magnetic head slider supporting device 20A with respect to the actuator arm 25A. The flap portions 400a and 400b have openings 400a1 and 400b1 formed therein, respectively, each of the openings 400a1 and 400b1 corresponding to the through hole 25Aa. One end of each of the wiring patterns 401 reaches the respective one of the flap portions 400a and 400b, and terminals 402 are formed at these ends of the wiring patterns 401, respectively. The terminals 402 provided on the flap portion 400a are provided, around the opening 400a1, in an arrangement corresponding to respective corners of a square, and, also, corresponding to the above-mentioned arrangement of the terminals 301 of the suspension 30A, shown in FIG. 8C.

The ring-shape projection 85A of the spacer 80A is caused to fit into the opening 25Aa of the actuator arm 25A so that the magnetic head slider supporting device 20A is positioned with respect to the actuator arm 25A. Then, the ring-shaped projection 85A is staked so that the magnetic head slider supporting device 20A is fixed to the actuator arm 25A. A portion of the suspension 30A on the side of the fixed end thereof is clamped between the spacer 80A and the actuator arm 25A, and, thus, is fixed there.

When the magnetic head slider supporting device 20A is fixed to the actuator arm 25A, the terminals 301 of the wiring patterns 44A which extend on the bottom surface 30Ab of the suspension 30A face the terminals 402 of the wiring pattern 401 of the flexible printed cable 400, respectively. As a result of the magnetic head slider supporting device 20A being fixed to the actuator arm 25A, the terminals 301 are pushed onto the terminals 402, respectively, and, thereby, the magnetic head slider supporting device 20A is electrically connected with the belt-shape flexible printed cable 400. Thus, it is possible to electrically connect the magnetic head slider supporting device 20A with the belt-shape flexible printed cable 400 merely by fixing the magnetic head slider supporting device 20A to the actuator arm 25A. Therefore, it is not necessary to perform a special work for electrically connecting the magnetic head slider supporting device 20A with the belt-shape flexible printed cable 400 after fixing the magnetic head slider supporting device 20A to the actuator arm 25A.

A head IC is connected with the X2-direction end of the flexible printed cable 400.

As shown in FIG. 7B, another magnetic head slider supporting device 20A is fixed to the bottom side of the actuator arm 25A in the same manner as that in which the magnetic head slider supporting device 20A on the top side is fixed to the actuator arm 25A.

Figure 9A:
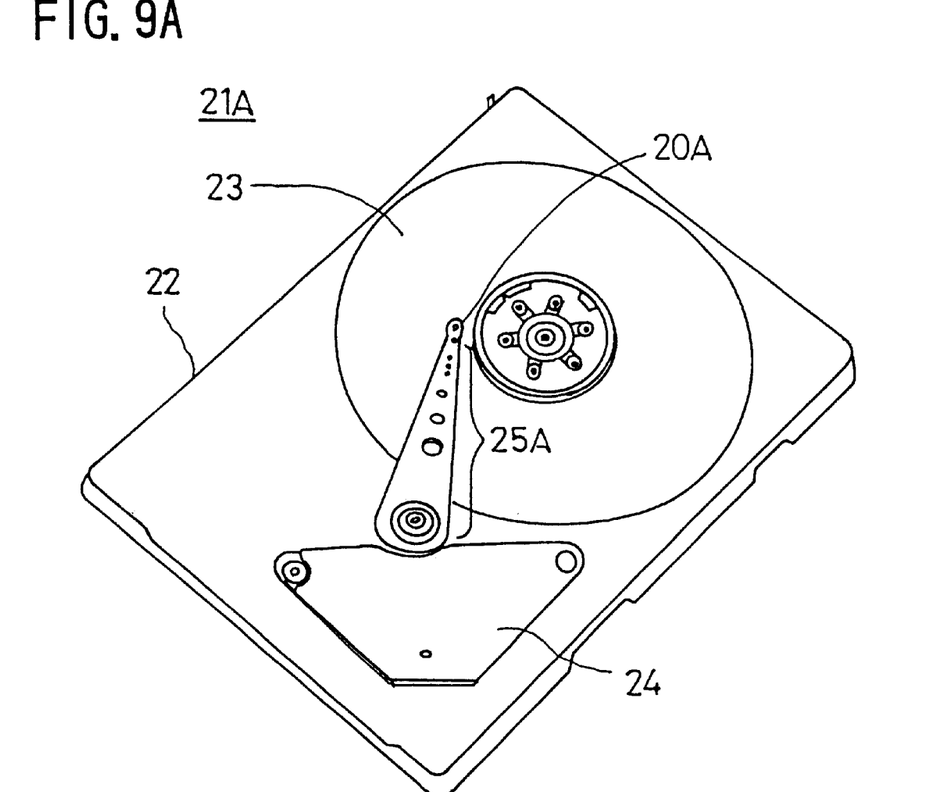
FIGS. 9A and 9B show a magnetic disk device in which the magnetic head slider supporting device shown in FIG. 6 is used.
Figure 9B:
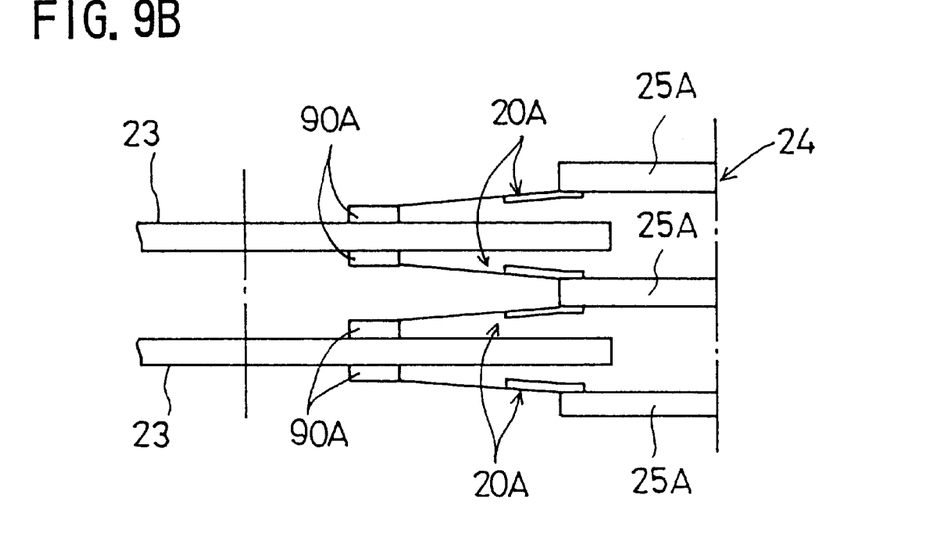

FIGS. 9A and 9B show a magnetic disk device 21A in which the above-described magnetic head slider supporting devices 20A are incorporated.

The present invention can also be applied to a head slider supporting device in which, instead of the magnetic head slider, an optical head slider, which is integrally provided with an optical head and a slider, is mounted on the head slider supporting device. Thus, the present invention can be applied to the suspension for an optical head slider, an optical head slider supporting device and an optical disk device.

Further, the present invention is not limited to the above-described embodiments, and variations and modifications may be made without departing from the scope of the present invention.

The contents of the basic Japanese Patent Application No. 10-072881, filed on Mar. 20, 1998, are hereby incorporated by reference.

What is claimed is:

1. A head slider supporting device comprising:

a suspension having a head slider mounting prearranged portion on which a head slider integrally having a head is mounted, a head IC chip mounting prearranged portion on which a head IC chip is mounted, and wiring patterns extending from said head slider mounting prearranged portion;

wherein:

said head IC chip mounting prearranged portion includes through holes formed in said suspension, and head IC chip mounting terminals provided on a first surface of said suspension, which first surface is opposite to a second surface on which said head slider mounting prearranged portion is provided, said terminals being electrically connected with extending ends of said wiring patterns via said through holes, said terminals being provided in an arrangement corresponding to terminals of said head IC chip; and said head IC chip is mounted on said first surface of said suspension, which first surface is opposite to said second surface on which said head slider is mounted.

2. The head slider supporting device, as claimed in claim 1, wherein said through holes are provided in an arrangement corresponding to said terminals of said head IC chip, and said head IC chip mounting terminals are formed at ends of said through holes.

3. A disk drive comprising:

an actuator;

a disk to be rotated;

an actuator arm driven by said actuator; and a head slider supporting device which is rotated integrally with said actuator arm;

wherein said head slider supporting device comprises:

a suspension having a head slider mounting prearranged portion on which a head slider integrally having a head is mounted, a head IC chip mounting prearranged portion on which a head IC chip is mounted, and wring patterns extending from said head slider mounting prearranged portion;

wherein:

said head IC chip mounting prearranged portion includes through holes and head IC chip mounting terminals on a first surface of said suspension, which first surface is opposite to a second surface on which said head slider mounting prearranged portion is provided, said terminals being electrically connected with an extending end of said wiring patterns via said through holes, said terminals being provided on an arrangement corresponding to terminals of said head IC chip; and said head IC chip is mounted on said first surface of said suspension, which first surface is opposite to said second surface on which said head slider is mounted.

4. A suspension having a head slider mounting prearranged portion on which a head slider integrally having a head is mounted, a head IC chip mounting prearranged portion on which a head IC chip is mounted, and writing patterns which extend from said head slider mounting prearranged portion;

wherein said head IC chip mounting prearranged portion includes through holes formed in said suspension and head IC chip mounting terminals on a first surface of said suspension, which first surface is opposite to a second surface on which said head slider mounting prearranged portion is provided, said terminals being electrically connected with extending ends of said wiring patterns via said through holes, said terminals being provided in an arrangement corresponding to terminals of said head IC chip.

5. The suspension, as claimed in claim 4, wherein said through holes are provided in an arrangement corresponding to said terminals of said head IC chip, and said head IC chip mounting terminals are formed at ends of said through holes.

* * * * *

UNITED STATES PATENT AND TRADEMARK OFFICE
CERTIFICATE OF CORRECTION

PATENT NO.     : 6,266,213 B1
DATED          : July 24, 2001
INVENTOR(S)    : Hiraoka It is certified that error appears in the above-identified patent and that said Letters Patent is hereby corrected as shown below:

<u>Column 14,</u>
Line 13, delete "wring" and insert -- wiring -- therefor.
Line 33, delete "writing" and insert -- wiring -- therefor.

Signed and Sealed this

Twenty-eighth Day of May, 2002

Attest:

Attesting Officer

JAMES E. ROGAN
Director of the United States Patent and Trademark Office